United States Patent [19]

Pattantyus

[11] Patent Number: 5,729,164

[45] Date of Patent: Mar. 17, 1998

[54] SOLENOID DRIVER INTERFACE CUSTOM INTEGRATED CIRCUIT

[75] Inventor: Tamas Imre Pattantyus, North Olmsted, Ohio

[73] Assignee: AlliedSignal Truck Brake Systems Co., Elyria, Ohio

[21] Appl. No.: 583,946

[22] Filed: Jan. 11, 1996

[51] Int. Cl.$^6$ .................................................. H03K 3/00
[52] U.S. Cl. ........................ 327/110; 327/20; 327/333; 361/18; 361/86; 364/426.15
[58] Field of Search .................. 327/108–112, 333, 327/427, 432, 434, 18, 20; 364/483, 492, 426.15; 361/18, 86, 87

[56] References Cited

U.S. PATENT DOCUMENTS

| | | | |
|---|---|---|---|
| 2,556,471 | 6/1951 | Elam | 310/155 |
| 4,167,734 | 9/1979 | Logan et al. | 340/682 |
| 4,319,188 | 3/1982 | Ito et al. | 324/173 |
| 4,862,752 | 9/1989 | Hoyt | 73/862.326 |
| 4,894,613 | 1/1990 | Tsugawa | 324/173 |
| 5,001,641 | 3/1991 | Makino | 364/426.21 |
| 5,140,524 | 8/1992 | Matsuda | 364/426.016 |
| 5,161,112 | 11/1992 | Guerra et al. | 364/483 |
| 5,195,011 | 3/1993 | Giorgetta et al. | 361/87 |
| 5,444,590 | 8/1995 | Lecomte et al. | 361/18 |
| 5,596,466 | 1/1997 | Ochi | 361/18 |

*Primary Examiner*—Timothy P. Callahan
*Assistant Examiner*—Kenneth B. Wells
*Attorney, Agent, or Firm*—Howard G. Massung

[57] ABSTRACT

An electronic interface custom integrated circuit which provides interfacing between micro-controller devices and field effect transistors in truck or car anti-lock braking systems for controlling solenoid valves to modulate the pressure in the brake chambers or brake cylinders. The interface circuit includes built-in diagnostic and safety features including fault protection interlock, safety interlocks, status indication outputs and a special purpose analog output for enhancing the performance of anti-lock braking system electronic control units.

38 Claims, 6 Drawing Sheets

SOLENOID DRIVER INTERFACE CUSTOM INTEGRATED CIRCUIT

FIELD OF THE INVENTION

This invention relates to micro-controller interface circuits. More particularly, this invention relates to electronic interface custom integrated circuits used in automotive or truck anti-lock brake system (ABS) electronic control units (ECU).

BACKGROUND OF THE INVENTION

It is common practice in ABS ECU technology to control solenoid operated valves in the brake systems by means of a micro-processor or single chip micro-controller device to modulate the pressure in the brake chambers or brake cylinders. Generally, the power requirements of the solenoid valves greatly exceed the power handling capability of the micro-processor devices. Therefore, a power transistor is usually placed between the solenoid and the micro-processor. The power transistor most often used is a field-effect transistor (FET). In principle, the gate of the FET device can be directly controlled by the micro-processor device. However, there are advantages in applying some interface circuits between the mentioned devices. The interface device, called a solenoid driver interface (SDI), can be designed with built-in diagnostic and safety features to enhance the performance of the ABS ECU and to lighten the burden on the micro-processor device. The basic form of control of an ABS is real-time and there are generally a number of actions/decisions the micro-processor must make with conflicting priorities.

Thus, there is a need for an improved solenoid driver interface which lightens the burden on the micro-processor device and assists the micro-processor in handling conflicting priorities. There is also a need for an improved solenoid driver interface which provides built-in diagnostic and safety features to enhance the performance of the ABS ECU.

SUMMARY OF THE INVENTION

The present invention provides a four-channel interface custom integrated circuit developed as an application specific integrated circuit (ASIC) which provides interfacing between micro-controller devices and field effect transistors (FETs) in truck or car anti-lock brake systems. The disclosed circuit features fault protection interlock, safety interlocks, status indication outputs and a special purpose analog output.

One object of the present invention is to provide a solenoid driver interface which lightens the burden on the micro-processor device and assists the micro-processor in handling conflicting priorities.

Another object of the present invention is to provide a solenoid driver interface which provides built-in diagnostic and safety features to enhance the performance of the ABS ECU.

In order to achieve the foregoing objects, the present invention provides a four-channel interface circuit between micro-controller ports and FET gates in a single application specific integrated circuit (ASIC) configured with independent solenoid control input for each channel, common enable input for two channels, common status indication for two channels, detection of solenoid integrity (normal, open or short circuit conditions), and a common inhibit input which prevents all four channels from responding to a "solenoid-on" command with positive gate-driver voltage, wherein the power FET is automatically switched-off when a shorted solenoid coil condition is detected and the analog of the drain voltage of the FET, which is indicative of the power control of the solenoid, is dynamically attenuated and coupled to an analog input port of the micro-processor by means of a multiplexed analog interface.

Further objects, features and advantages of the present invention will become apparent from a consideration of the following description and the appended claims when taken in connection with the accompanying drawings.

DETAILED DESCRIPTION OF THE PREFERRED EMBODIMENT

Figure 1:
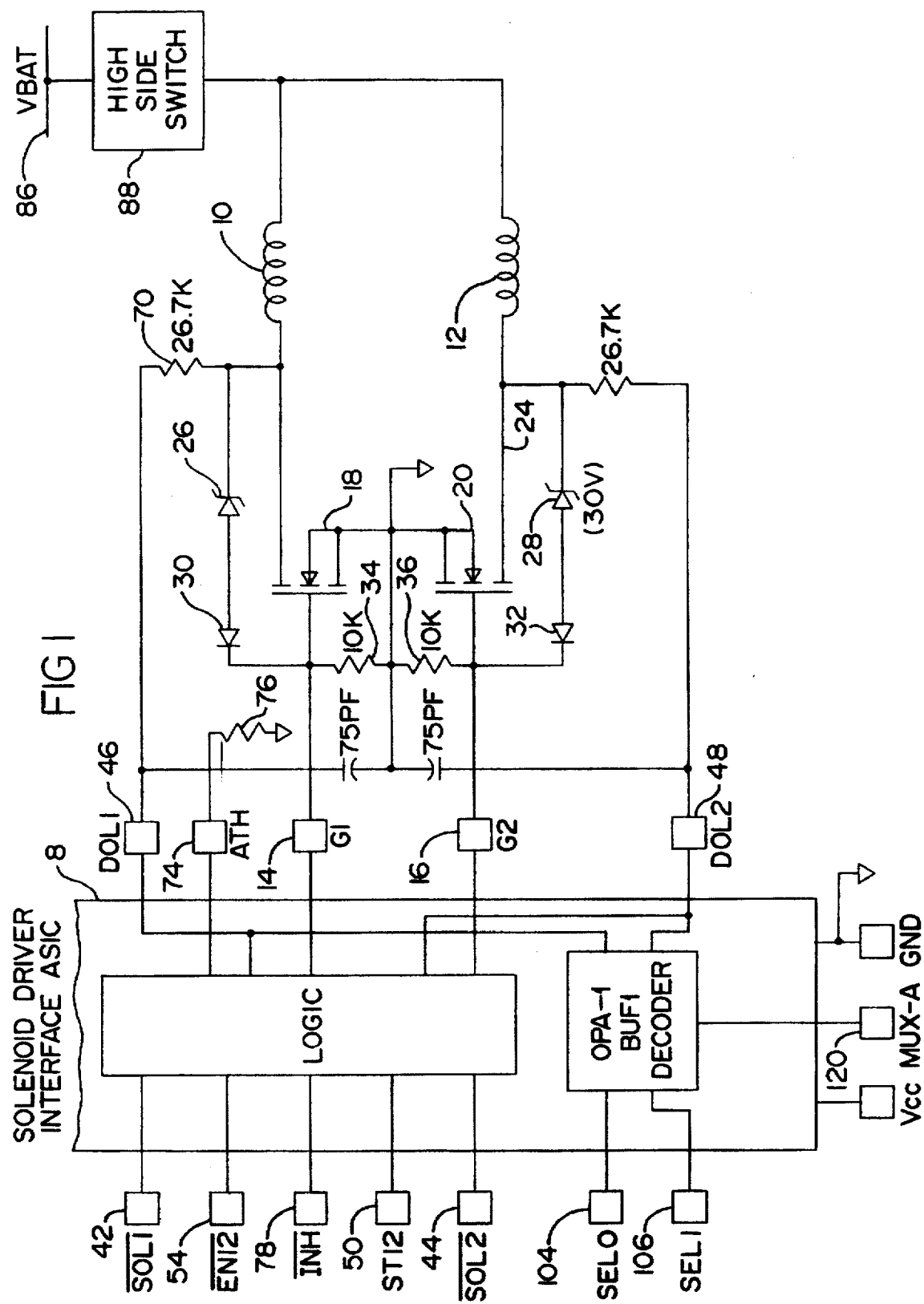
FIG. 1 is a partial schematic block diagram of the solenoid driver interface application specific integrated circuit, the power field effect transistors and the solenoid build and exhaust valves of the present invention.

Preferred embodiments of the solenoid driver interface circuit are described herebelow with reference to the drawings.

The four channels of the interface custom integrated circuit are configured as two sets of two channels and are pair-wise enabled, each by a single enable input. The status of the channels in each set is indicated by a common status line and the lines are logic 1 (close to Vcc or 5V ASIC supply voltage) when the command inputs and the power FET drain voltages, driven by the channels receiving the input commands, are in agreement.

The voltage, derived from the drain voltage of each power FET controlled by the ASIC channels, is compared to an adjustable voltage reference and if the drain voltage of a power FET, which has been turned on, is more positive than the reference voltage, it is taken as a sign of a shorted solenoid and the gate drive to the affected FET is turned off. The status line will indicate a fault in that case. The turn-off state is permanently latched and the latching can only be removed when the control input is also switched into the off state and then back to the on state again. The voltage on the reference voltage input can be adjusted from 0V to +1.5V by an external programming resistor connected between the reference voltage pin "ATH" and ground. When the FET is turned on, the input voltage derived from the drain voltage is not attenuated or somewhat attenuated (2:1 or less). When the FET is turned off a 10:1 attenuator is activated within the ASIC.

The drain voltage signals of the FETs are presented through a multiplexed analog interface to the micro-controller. The monitored voltage is the same as the one compared to the reference voltage as mentioned previously. Only one FET drain out of four is monitored by the multiplexed analog channel at any given time and the selection is made within the ASIC by appropriately decoding the logic level on two selector lines.

An external logic 0 signal with substantial current sinking capability can be applied to all channels to simultaneously turn off all power FETs. The gate drive to each power FET is clamped to ground within the SDI and the internal logic also turns the gate drives off. When external logic 0 signal is turning the channels off the status signal associated with all those channels which are receiving an "on" input command are flagged with status errors.

The preferred implementation of the semi-custom SDI integrated circuit is based on a bi-polar linear transistor array with a large number of transistor cells each configurable either as an NPN transistor with common collector and base and one, two or three emitters, or as a PNP device with common emitter and base and two collectors. In addition, there is a multitude of 750 Ω resistors, several large NPN and PNP transistors, and an array of Schottky-clamped transistors. The linear arrays are pre-fabricated on a silicon wafer but the fabrication process does not include the design of the interconnecting metal mask. The mask is custom designed to suit the specific circuit application and deposited on the pre-fabricated silicon wafer. Although the mentioned technology is preferred mainly for cost reasons, full custom integration using bi-polar or CMOS technology is quite conceivable and this fact should not change the validity of the basic invention as disclosed in this application. The specific circuit implementation of the block diagram and logic of this interface, as disclosed below, can also take many forms while performing the same functions.

Figure 2:
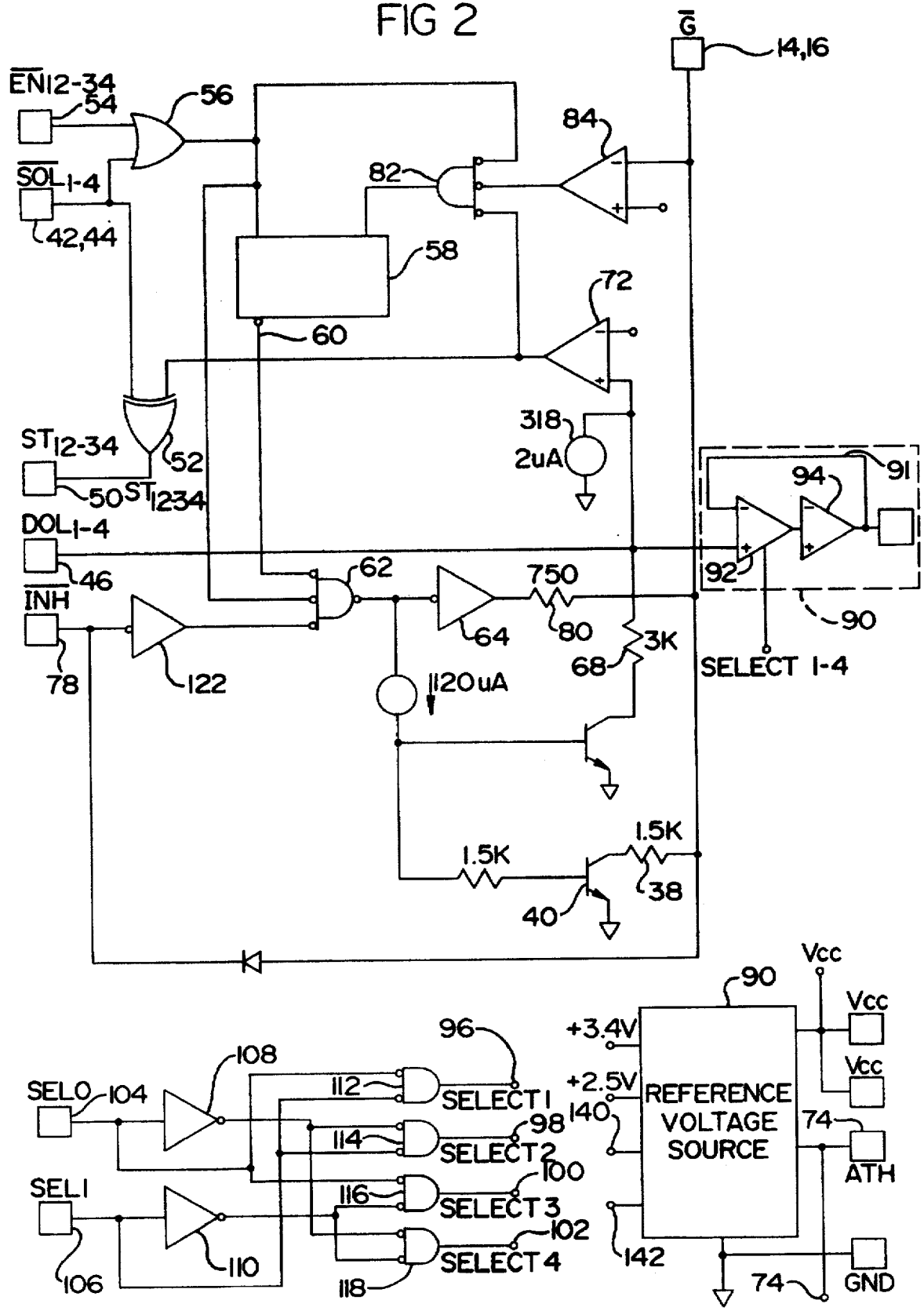
FIG. 2 is a schematic logic circuit diagram of the solenoid driver interface circuit of the present invention.

Referring to FIGS. 1 and 2, the solenoid driver interface (SDI) integrated circuit, designated generally at 8, is configured as a four channel application specific integrated circuit (ASIC). It should be noted that FIG. 1 illustrates only half of the ASIC, showing two of the four channels being used to control a brake chamber or cylinder. FIG. 2 attempts to illustrate all four channels of the ASIC. However, for simplicity only the channels illustrated in FIG. 1 are numbered. It can be assumed that the other channels in FIG. 2 operate as described with reference to the channels illustrated in FIG. 1.

The SDI is designed as an interface between a microprocessor and the solenoids of an anti-lock braking system. FIG. 1 shows in detail most of the components involved in solenoid control. Two solenoid valves 10 and 12 form a modulator associated with one brake chamber. Air pressure can be built in the brake chamber by opening the build valve 10 and closing the exhaust valve 12 (both solenoids are de-energized) and pressure can be vented by energizing both valves. The valve solenoid typically draws 3A three amps of current at room temperature from the 12V battery. When the SDI output 14 or 16 exceeds +2.4V, the corresponding Field Effect Transistor (FET) 18 or 20 respectively turns on and the current builds up in the corresponding solenoid 10 or 12 exponentially with a time constant of millisecond order of magnitude. When the SDI output 14 or 16 is at or near ground potential, the corresponding FET 18 or 20 respectively is turned off and the current stored in the solenoid inductance is dissipated through the FET 18 or 20 as described below. Disruption of the FET's current causes the potential at FET's drain 18 or 20 to rapidly go positive and when it exceeds the "on" gate voltage plus 30.7V (the sum of the Zener diode 26 or 28 and rectifying diode 30 or 32 voltages) the FET 18 or 20 is turned back on again, the Zener diode 26 or 28 and the rectifying diode 30 or 32 form a negative feedback path and the gate voltage of the FET 18 or 20 will be held positive as long as current flows in the solenoid 10 or 12. During the period of current decay, SDI output 14 or 16 is referenced to ground by means of the external 10 kΩ resistor 34 or 36 respectively and the 1.5 kΩ resistor 38 and the transistor 40 inside the logic as shown in FIG. 2.

The block diagram of the solenoid driver interface ASIC 8 is shown in FIG. 2. There are primary and secondary functions in this ASIC. The functional descriptions will be given for channel 1 whenever applicable.

One of the primary functions of the SDI is to produce positive (+3.8V or greater) signals at the SDI outputs 14, 16 in response to low level inputs (+0.7V or lower) from the microprocessor at the SDI inputs 42, 44 and 54 (/EN12). It should be noted that when the SDI outputs 14, 16 are positive and the solenoid driver FETs, solenoid impedance and all the associated connections are in order, SDI inputs 46, 48 input 48 being indicated only in FIG. 1 are at near ground potential (less than +1V).

Another primary function of the SDI is to provide status indications to the microprocessor at status output 50. When SDI inputs 42, 44 are low, inputs 46, 48 are also expected to be low and vice versa. The status of the input and output signals is compared in an exclusive-or gate 52 via a signal from a comparator 72 and in case of agreement between the inputs 42, 44 and output 46, 48, status outputs 50 are high (+4V or more).

When input 54 or 42 is logic 1 (+4V or more), the output of OR gate 56 is logic 1 and flip/flop 58 is set causing the flip/flop output 60 to be at logic 0 level (near 0V). The logic 1 output of OR gate 56 causes the output of AND gate 62 to be logic 1, which makes the input of inverter 64 logic 1, which turns on transistors 66 and 40. SDI output 14 is near 0V in this state for two reasons:

1) the output of inverter 64 is not driven high; and 2) transistor 40, clamps output 14 low through the 1.5 kΩ resistor 38.

Transistor 66 also conducts, thus, a path of 3 kΩ impedance is provided between input 46 and ground, through resistor 68.

When any one of the two solenoids is turned on, transistor 66 in FIG. 2 is turned off, thus the drain voltage analog of the conducting FET 18 is not attenuated by the 26.7 kΩ series resistor 70 externally connected to the ASIC 8 because the ground path of the internal 3 kΩ resistor 68 is opened up. The magnitude of the drain voltage analog is checked by comparator 72 in FIG. 2 and if it is more positive than input signal 74, the output of comparator 72 is also positive (logic 1). Input signal 74 is an adjustable threshold voltage and it can be set to any value between 0V and +1.5V by means of an appropriately sized external resistor 76 in FIG. 1. If the power FET 22 is fully turned on, the device saturates and its drain voltage 46 will be very near to ground and less positive than input signal 74.

Power FET 22 can only be turned on if signal 42 and signal 54 are simultaneously at logic 0 (near 0V) and input signal 78 is logic 1 (near +5V). Since the previous input states have set flip/flop 58, output 60 at logic 0 (near 0V), the output of OR gate 56 is also logic 0. Thus, all inputs to AND gate 62 are at logic 0, and consequently the output of AND gate 62 will also be at logic 0. The output of AND gate 62 will turn off transistors 66 and 40 and will cause the output of inverter 64 to be logic 1 (greater +4V). Therefore, the output 14 of the FET 18 will begin to become more and more positive. The transition from low voltage to high voltage at output 14 will not be instantaneous because of the capacitive impedance of FET gates. The gate capacitance of FET 18 with the 750 Ω series resistance 80 between the output of inverter 64 and output 14 causes FET 18 to turn on with a time delay. FET 18 will be fully turned on when the output voltage exceeds +2.4V and signal 46 will be a few tenths of a volt more positive than ground under normal, no-fault conditions. The input signal 74 is adjusted so that it is more positive than the worse case input 46 voltage under normal load conditions. The output of comparator 72 is high, which inhibits the high output of NAND gate 82. When the output voltage becomes more positive than +3.4V, the output of comparator 84 becomes negative. NAND gate 82 is primed by the outputs of OR gate 56 and comparator 72. This fact is very significant in case of a potentially catastrophic failure, i.e. when the solenoid is shorted. In that case, the current through the turned on FET 18 becomes very high while the drain voltage is also high (it can be as high as the battery voltage 86 if the high side switch 88 shown in FIG. 2 is a relay contact). The fault condition is detected by comparator 72 as logic 0 as soon as the output voltage exceeds +3.4V and the output of comparator 84 is also logic 0. When all three inputs to NAND gate 82 are negative (logic 0), its output will be logic 1 which promptly resets flip/flop 58. When flip/flop 58 is reset, the positive gate drive is turned off by AND gate 62 and inverter 64 and a status error is flagged by exclusive OR gate 52 at status output 50. Flip/flop 58 is latched in the reset state until either input 42 or 54 becomes logic 1 again.

When the gate drive to FET 18 is turned off, input 46 is returned to ground through 3 kΩ resistor 68. Thus, the drain voltage is attenuated by a factor 1:10 by means of external 26.7 kΩ resistor 70 and internal 3 kΩ resistor 68 at input 46. This way both the regular switch off transient and the steady battery voltage which exist at the drain of FET 18 with high side switch 88 closed is attenuated by a factor of 10 when it is connected to the negative input nodes of comparators 72 and 84. Status output 50 is high when input 42 is logic 1 and the output of comparator 72 is logic 0. This means that when the solenoid drive is commanded to be off by input 42, the proper state of signal 46 is expected to be a voltage more positive than input signal voltage 74. If, however, the solenoid on command is overridden either by means of signal 78 or signal 54, solenoid 10 is, indeed, turned off and a status error is flagged.

This part of the circuit provides a dynamically attenuated feedback path connected between the drain of power FET 18 or 20 and the logic within ASIC 8. When power FET 18 or 20 is turned on and the drain voltage is a few tenths of a volt above ground potential, the attenuation is not increased. When power FET 18 or 20 is turned off, the attenuation is multiplied by ten. The attenuation is controlled by the same logical states that determine the gate drive to power FET 18 or 20 and with it the state of its drain voltage.

Furthermore, the state of the drain voltage is compared to a reference voltage 74 which can be pre-adjusted between 0V and +1.5V by means of an external resistor 76. The reference level is common to all four channels. When the solenoid drive is commanded off by a logic 1 at inputs 42 or 44, the voltage on the corresponding input lines 46 or 48 is expected to be higher than reference voltage 74 provided high side switch 88 is closed. When the solenoid drive is commanded on by means of a logic 0 at inputs 42 or 44 and 54, the voltage on the lines 46 or 48 is expected to be less positive than reference voltage 74. In both cases, when the voltage state of signals 46 and 48 are as expected, i.e. the solenoid drive has properly responded to the command, the voltage on status output 50 is logic 1. In all other cases, it is logic 0. An added feature is that when high side switch 88 is open and inputs 42, 44 are logic 1, status line 50 is logic 0 because the drain voltage of the corresponding power FET 18 or 20 is at near ground potential. This feature provides a built in detection of any direct short circuit between the FETs', 18 or 20, drain and battery voltage 86, of an open circuit solenoid and of a shorted solenoid to ground.

Finally, if the drain voltage of solenoid driver FET 18 or 20 is higher than reference voltage 74 in the on state, it can be caused by a shorted solenoid coil to battery voltage 86 or to high side switch 88. In either case, serious potential damage to the circuit is avoided by turning the gate drive to FET 18 or 20 off as soon as the gate voltage exceeds +3.4V. This action is controlled by NAND gate 82, comparators 72 and 84 and flip/flop 58. Under this fault condition, flip/flop 58 is reset which prevents the generation of the "on" gate drive voltage. Flip/flop 58 stays reset until either input 42 or 54 changes state from logic 0 to 1.

The secondary control functions preformed by the SDI are not absolutely necessary to the control of the solenoid driver FETs. One such function is to provide a multiplexed analog output voltage equal to one of the line voltages 46 or 48. Another is to provide a centralized inhibit by means of a logic 0 on input line 78. Another circuit function necessary to the proper functioning of the ASIC is shown in FIG. 2 as providing a "Reference Voltage Source" 90. The use of this group of circuits is discussed in more depth later in the specification, where the description of the actual circuit implementations of the logic functions are given.

The input lines 46 and 48 are also connected to a four-channel unity gain, multiplexed operational amplifier consisting of two major parts;
a) a multiplexed input stage 92 each sharing the same feedback path (shown as 91 in FIG. 2); and
b) a common buffer output 94 sharing the input line with all front stages.

Multiplexing is accomplished by activating one of the four select lines 96, 98, 100 or 102. There are two lines to the ASIC, 104 and 106, and lines 96, 98, 100 and 102 are generated by means of inverters 108 and 110 and NAND gates 112, 114, 116 and 118. Lines 96, 98, 100 and 102 will provide the supply source to op-amp 92 in the selected channel. Thus, the combination of the unity gain buffer 94 and one of the op-amps 92 is always active at any given time. This means that the voltage on one of lines 46 or 48 is always connected to the pin 120 of ASIC 8.

Control input 78 is supplied either by a micro-controller port or by a hardware supervisory circuit. When input 78 is logic 0, it removes the positive gate drive from all four channels and, in addition, it clamps the gates to ground through a diode (30 in FIG. 1). When input 78 is logic 0, the output of inverter 122 is logic 1. Therefore, the output of AND gate 62 is also at logic 1, which will remove the gate drive provided by inverter 64. Each of the outputs 14 and 16 is connected to input 78 through a diode, D1, which will provide a stronger clamp to ground than the softer clamping of the 1.5 kΩ resistor 38 controlled by transistor 40. The clamping function is used in the system any time when there are serious doubts about the integrity of the whole system (battery voltage is above the higher limit of operation or below the lower limit, the 5V system voltage is outside the specified range, the timing of the watch-dog pulses is outside the proper range, etc.).

SDI ASIC 8 has a few overhead circuits the functions of which are needed in all four channels. The four channels consist of identical circuits. As shown by the numbering in the figures there is a correspondence between components in FIG. 2 and the circuit details shown in FIG. 4–6. The circuit descriptions will be given in terms of channel 1.

Figure 3:
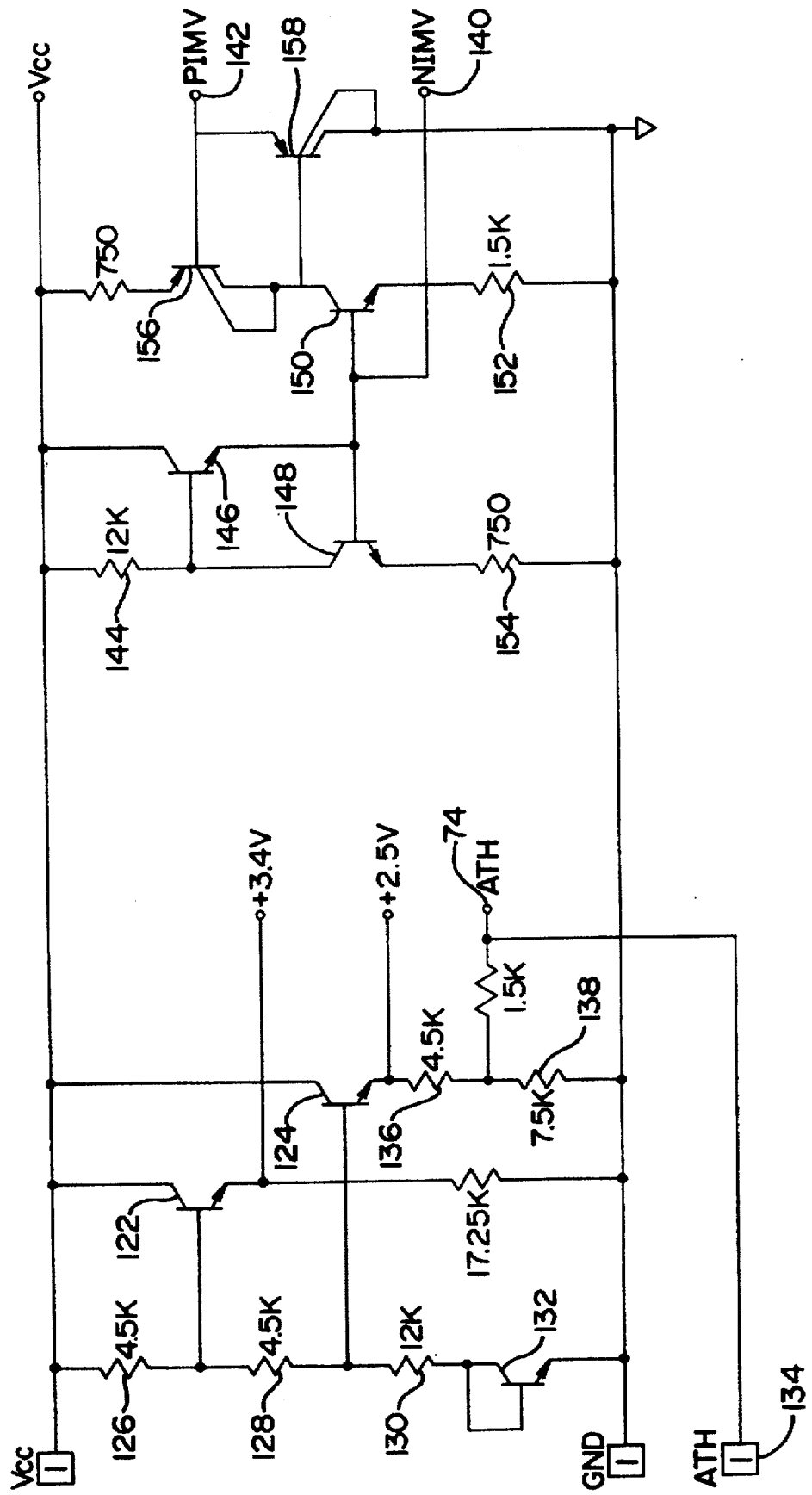
FIG. 3 is a schematic circuit diagram of the reference voltage source of the present invention.
Figure 4:
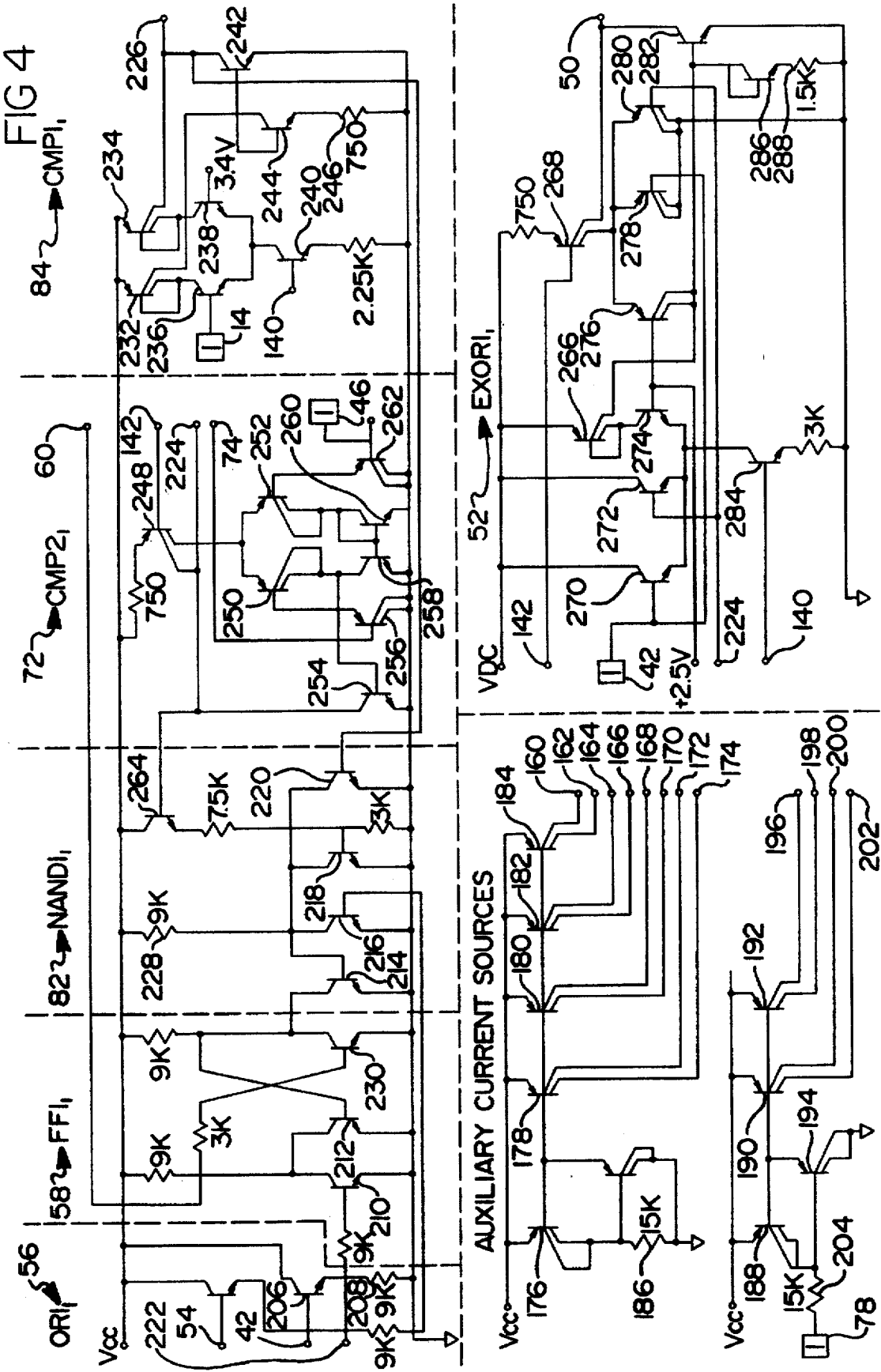
FIG. 4 is a schematic circuit diagram of the OR-gate, flip/flop, NAND-gate, comparators, EXCLUSIVE-OR-gate and auxiliary current sources of FIG. 2.

Referring now to the overhead circuits shown in FIG. 3 and 4, in FIG. 3, a reference voltage source is shown generating three DC reference voltages: 3.4V, 2.5V and reference voltage 74. The +3.4V source is derived from the emitter of an emitter follower transistor 122 and the +2.5V source from another emitter follower transistor 124. The base voltages of those transistors are derived from a voltage divider comprising resistors 126, 128 and 130 and a compensating diode 132. Reference voltage 134 is produced by coupling to one side of resistor R7 connected to an external pin 74 and is also routed within ASIC 8. Resistors 136 and 138 set the reference voltage 134 to +1.5V if the pin 74 is left open circuit. If pin 74 is shorted to ground, it will only interfere with the +2.5V reference in a minor, negligible way. Any impedance between those extreme values will set an intermediate reference voltage 74 between +1.5V and 0V. Compensating diode 132 will provide some temperature stabilization for the emitter voltage of transistor 124 and, for a lesser degree, for the emitter voltage of transistor 122.

Two current mirror control voltage lines, 140 and 142 are also shown in FIG. 3. The voltage drop across resistor 144 is approximately 3.4V at Vcc=+5V, thus the current through it is 0.283 mA. The current flowing into the base of transistor 146 is negligibly small, therefore, all current flowing through resistor 144 will be conducted by the collector of transistor 148. The base current of transistor 148 will be just sufficient to conduct its collector current, thus the base-emitter voltage difference of transistor 148 corresponds to the collector current transistor 148 is conducting. Since the NPN transistors on the same die are very similar in geometry, material, and temperature, it is expected that every transistor with a 750 Ω resistor between its emitter and ground and with its base connected to the base of transistor 148 will conduct the same 0.283 mA current: i.e. the current of transistor 148 is mirrored to those transistors. The amplitude of the mirrored current can be controlled by the emitter resistance. Thus, the current through transistor 150 will be nearly half of that of transistor 148 because resistor 152 is twice the value of 154. Line 140, therefore, controls all NPN current mirrors in the other parts of ASIC 8.

The current of transistor 150 is mirrored to transistor 156 through emitter follower transistor 158 to generate current mirror control line 142. Any PNP transistor connected to the line 142 will conduct approximately 0.140 mA provided the resistance between its emitter and Vcc (+5V) is 750 Ω.

There are other current sources generated by means of current mirrors as shown in FIG. 4. Lines 160, 162, ... 174 are generated by mirroring the current of transistor 176 to transistors 178, 180, 182 and 184. The current through resistor 186 is approximately 0.24 mA at Vcc=+5V. The base voltage of transistor 176 corresponds to that current; since lines 160 and 162 are taken from two collectors fed by the same emitter of transistor 184, each collector current will be half of the 0.24 mA, or 0.12 mA. The current mirror consisting of transistors 188, 190, 192 and 194 is very similar in construction, except there are half as many current outputs as in the previous case and the currents are switched by means of logic input 78. Currents 196, 198, 200 and 202 are flowing from Vcc towards the destination sinks only when input 78 is near ground potential. Input 78 is a bi-level logic signal and it is also pulled up to Vcc with pull-up current paths, thus when input 78 is not near to ground it is near to Vcc and current through resistor 204 is zero, consequently all current outputs 196, 198, 200 and 202 are zero.

OR gate 56 consists of transistors 204 and 206 and common emitter resistor 208. When either input 42 or 54 is at logic 1, OR gate 56 is at logic 1, both transistor 210 and transistor 212 are conducting causing flip/flop 58 to be set and output 60 to be at logic 0. It will be clear from the subsequent sections, that only when output 60 equals logic 0 can the solenoid driver transistor be turned on. It can be said that when input 42 and input 54 are not simultaneously equal to logic 0, flip/flop 58 is primed.

Three-input NAND gate 82 consists of transistors 214, 216, 218 and 220 with inputs signals 222, 224 and 226. Drain voltage 46 is compared to reference voltage 74 in comparator 72 and input 224 is the output of comparator 72. If drain voltage 46 is more positive than reference voltage 74, signal 224 is logic 0. Similarly the gate voltage 14 is compared to a +3.4V reference in comparator 84 and if voltage 14 is more positive than +3.4V, signal 226 is logic 0. Thus, when simultaneously signals 222, 224 and 226 are logic 0, transistors 216, 218 and 220 are switched off, the base of transistor 214 is no longer clamped to near ground potential, and the current flowing through resistor 228 is driving the base of transistor 214. When transistor 214 is driven, its collector will clamp the collector voltage of transistor 230 to near ground potential, i.e. flip/flop 58 is reset. The conditions under which all three inputs to NAND gate 82 can be simultaneously equal to logic 0 are explained above.

Comparator 84 consists of transistors 232, 234, 236, 238, 240 and 242. When gate voltage 14 is less positive than +3.4V, transistors 234 and 238 will conduct the current of transistor 240 and transistors 232 and 236 are turned off. Since the current through the current-mirror half of transistor 232 is zero, the base current of transistor 242 is also zero and the base charge of transistor 242 is shunted to ground through diode 244 and resistor 246. The current through transistor 238 is mirrored by transistor 234 to the collector of transistor 242 and since transistor 242 is switched off, the mirrored current of transistor 234 is driving the base of transistor 220, inhibiting NAND gate 82. When gate voltage 14 is more positive than +3.4V, transistors 232 and 236 will be conducting the current of transistor 240 and transistors 234 and 238 will be turned off. The current of transistor 236 is mirrored by transistor 232 to the base of transistor 242 and it will be divided between the base of transistor 242 and the diode 244/resistor 246 path to ground. The current flowing into the base of transistor 242 is sufficient to turn transistor 242 on and since the mirrored current of transistor 234 is zero, transistor 242 will clamp the base of transistor 220 to ground thus enabling one of the inputs of NAND gate 82.

Comparator 72 consists of transistors 248, 250 ... 262. When drain voltage 46 is more positive than reference voltage 74, half of the current of transistor 248 is flowing through transistor 250. The current of transistor 250 drives the base of transistor 254 which clamps the base of transistor 264 to ground. The current of transistor 254 is much larger than the current sourced by one of the collectors of transistor 248, thus transistor 254 is in heavy saturation. Transistors 252, 258 and 260 are turned off in this state. When reference voltage 74 is more positive than drain voltage 46, transistor 252 will conduct and transistor 250 will not. The current of transistor 252 is mirrored to transistor 258 and since transistor 250 is not conducting, transistor 258 will saturate hard and clamp the base of transistor 254 to near ground allowing the current through transistor 248 to drive the base of transistor 264 positive. Therefore NAND gate 82 will be inhibited through transistor 218.

The logic states of signals 42 and 224 are compared in exclusive OR gate 52 (EXOR) consisting of transistors 266, 268 ... 286. Transistors 266, 270, 272, 274 and 284 form a NOR gate. If either signal 42 or 224 (or both are) is more positive than +2.5V, transistors 266 and 274 will not conduct and transistor 266 will not provide gate current for output transistor 282. The base current for transistor 282 will only be provided by transistor 266 if both signals 42 and 224 are simultaneously less positive than +2.5V.

Transistors 268, 276, 278 and 280 form an AND gate. If the inputs to both transistors 278 and 280 are more positive than +2.5V, half of the current of transistor 268 will flow through transistor 276 and transistor 276 will drive the base of transistor 282.

It can be concluded that the base current of transistor 282 is not provided only when the two inputs, 42 and 224 are not equal. In that case half of the current through transistor 268 will pull-up output signal 50, i.e. the output will be logic 1.

When the base of transistor 282 is driven either by transistor 266 or 276, some of the available current will flow through transistor 286 and resistor 288 and the rest will flow into the base of transistor 282. Since transistor 282 is a high current-gain transistor, its collector current will be much larger than the pull-up current from transistor 268. Therefore, transistor 282 will be in heavy saturation and output signal 50 will be pulled to ground, i.e. it will be at logic 0.

Figure 5:
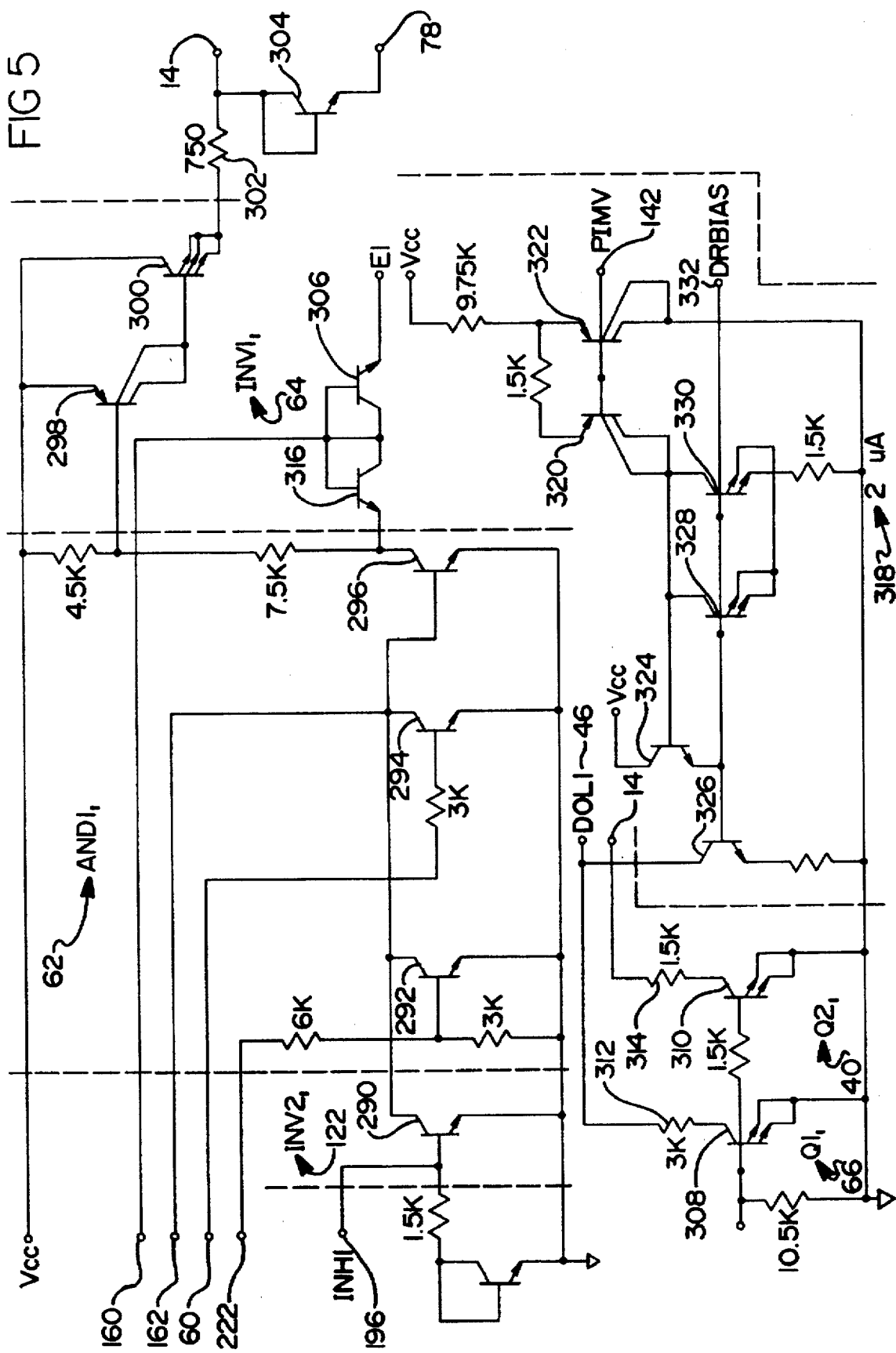
FIG. 5 is a schematic circuit diagram of the inverters, AND-gate, transistors and 2 μA path to ground of FIG. 2.

The gate control logic consists of AND gate 62, inverters 64 and 122 and NPN transistor 40. The circuit diagram of the gate control logic is shown in FIG. 5. If current source 196 is inactive, i.e. signal 78 is logic 1, transistor 290 is off. In addition, if both signals 222 and 60 are logic 0, transistors 292 and 294 are also off allowing current source 162 to drive the base of transistor 296. Transistor 296 is fully turned on, causing transistor 298 to be fully turned on, and thus making current 160 flow into the collector of transistor 296. Transistor 298 is not only turned on and thus supplying base current to transistor 300, but it is also saturated. Therefore, its collector voltage is only a few tens of millivolt less positive than Vcc (+5V). Transistor 300 amplifies its current three times more than if only one of its emitters were connected, thus providing a high current capacity voltage drive to output 14 through resistor 302. The voltage at the emitter of transistor 300 is approximately 4.1V, resistor 302 and the 10 kΩ resistor 34 connected between transistor 18 gate and ground (see FIG. 1) form a voltage divider so that gate voltage 14 will be about 3.8V. That is quite sufficient to fully turn on a logic level FET, such as FET 18, and it also exceeds the +3.4V reference voltage used in comparator 84. Notice that having signal 78 at logic 0 affects the gate control circuits in two different ways:

1. it directly clamps the gate to ground through diode 304; and
2. current 196 generated in that state of signal 78 will cause the output of AND gate 62 to be low, which, in turn, will switch off transistor 296, and with it, transistors 298 and 300; when signal 78 is at near ground potential, the charge stored in the gate capacitance of FET 18 will be dissipated to ground through diode 304.

When gate voltage 14 has to be switched off for whatever reason (either signal 222 or signal 60 is logic 1, or signal 78 is logic 0), transistor 296 is turned off allowing current 160 to flow through diode 306 into the bases of transistors 308 and 310. Both transistors 308 and 310 are turned on into saturation respectively providing a 3.0 kΩ 312 and a 1.5 kΩ 314 path to ground. Thus, the electrostatic charge stored in the gate capacitance of FET 18 is dissipated to ground through resistor 314 and transistor 310 and the gate is firmly clamped to ground preventing turning on FET 18 by spurious noise spikes.

Notice that when the gate is turned off by logic 1 at signal 60, flip/flop 58 is reset and the gate voltage can only be turned back on again, if signal 42 (signal 54) is turned off (logic 1) and then turned on (logic 0) again. Flip/flop 58 is reset only if drain voltage 46 is higher than reference voltage 74 when signal 222 is logic 0 (i.e. FET 18 is commanded to turn on) and gate voltage 14 is more positive than +3.4V. This condition can develop only if the solenoid terminal driven by FET 18 is shorted either directly to the positive battery voltage line or to the other solenoid terminal while high side switch 88 is turned on. Notice also, that under the mentioned fault conditions flip/flop 58 is automatically reset and FET 18 is turned off to prevent serious damage. When flip/flop 58 is reset, the states of inputs 42 and 46 are not in agreement, thus status line 50 will be logic 0. The solenoid driver interface not only recognizes this type of fault condition, but it also prevents power FET 18 from being turned on and it indicates at the status output that the command to turn on FET 18, i.e. logic 0 at inputs 42 and 54, has not been obeyed.

Drain voltage analog 46 is attenuated by a factor of ten at the input when solenoid driver power FET 18 is turned off (see FIGS. 1, 2 and 5). There is a 26.7 kΩ external resistor 70 connected between the drain of FET 18 and the drain voltage 46 input of ASIC 8. Within ASIC 8, the drain voltage 46 input is connected to a 3 kΩ resistor 312 and transistor 308. When FET 18 is turned off, gate voltage 14 is at near ground potential, transistor 296 is off, thus current 160 flows through transistor 306 into the base of transistor 308. The transistor 308 is driven into saturation, thus, its collector voltage is only a few tens of millivolt more positive than ground and the circuit of the 10:1 voltage attenuator (26.7 kΩ external 70 and 3 kΩ internal resistors 68) is complete. The voltage at the drain of FET 18 is approximately +30V for a few milliseconds immediately following turning FET 18 off, but in the steady state the voltage during the off state is 1–2 volts less than battery voltage (caused by safety components like reverse battery diode, high side switch 88, etc.). Drain voltage analog 46 is never more positive than +3V and typically it is 1.1V to 1.4V when FET 18 is off.

When FET 18 is turned on, gate voltage 14 is +3.8V, the base current to transistors 308 and 310 are shunted off to ground through diode 316 and transistor 296, thus the path between the drain voltage input and ground is broken and there is no attenuation of drain voltage 46. Drain voltage 46 is connected through external 26.7 kΩ resistor 70 to the drain voltage pin of ASIC 8 and from there to negative input node comparator 72 and the input of the multiplexed analog buffer 94. The other input of comparator 72, reference voltage 74, can be trimmed to be a few hundred millivolt or so more positive than the saturated drain voltage of FET 18 by means of an external programming resistor 76 connected between the reference voltage pin and ground.

Under some failure modes, the drain voltage associated with input 46 could be undetermined when FET 18 is turned on. This happens if the path between the drain of FET 18 and the drain voltage input of ASIC 8 is open circuit (open circuit 26.7 kΩ resistor 70, broken printed circuit board trace, broken bond wire within ASIC 8, etc.). A 2 µA current sourcing circuit to ground 318 to ground is provided ( as shown in FIGS. 2 and 5), which is sufficient to bias both comparator 72 and op-amp 92 inputs and to pinch the drain voltage just a few tens of millivolt above ground. Referring to FIG. 5, 2 µA consists of transistors 320, 322, 324, 326, 328 and 330. Notice that only transistor 326 is repeated in channels 2–4 and the bases of those transistors are driven by control line 332 also indicated in FIG. 5. The failure mode(s) in question can be detected when high side switch 88 is turned on and the low side switch is turned off. In that state, drain voltage 46 is expected to be approximately 1.1V to 1.4V, instead drain voltage 46 will be nearly 0V. That will affect both status output 50 and multiplexed analog output, 120, when channel 1 is selected.

Figure 6:
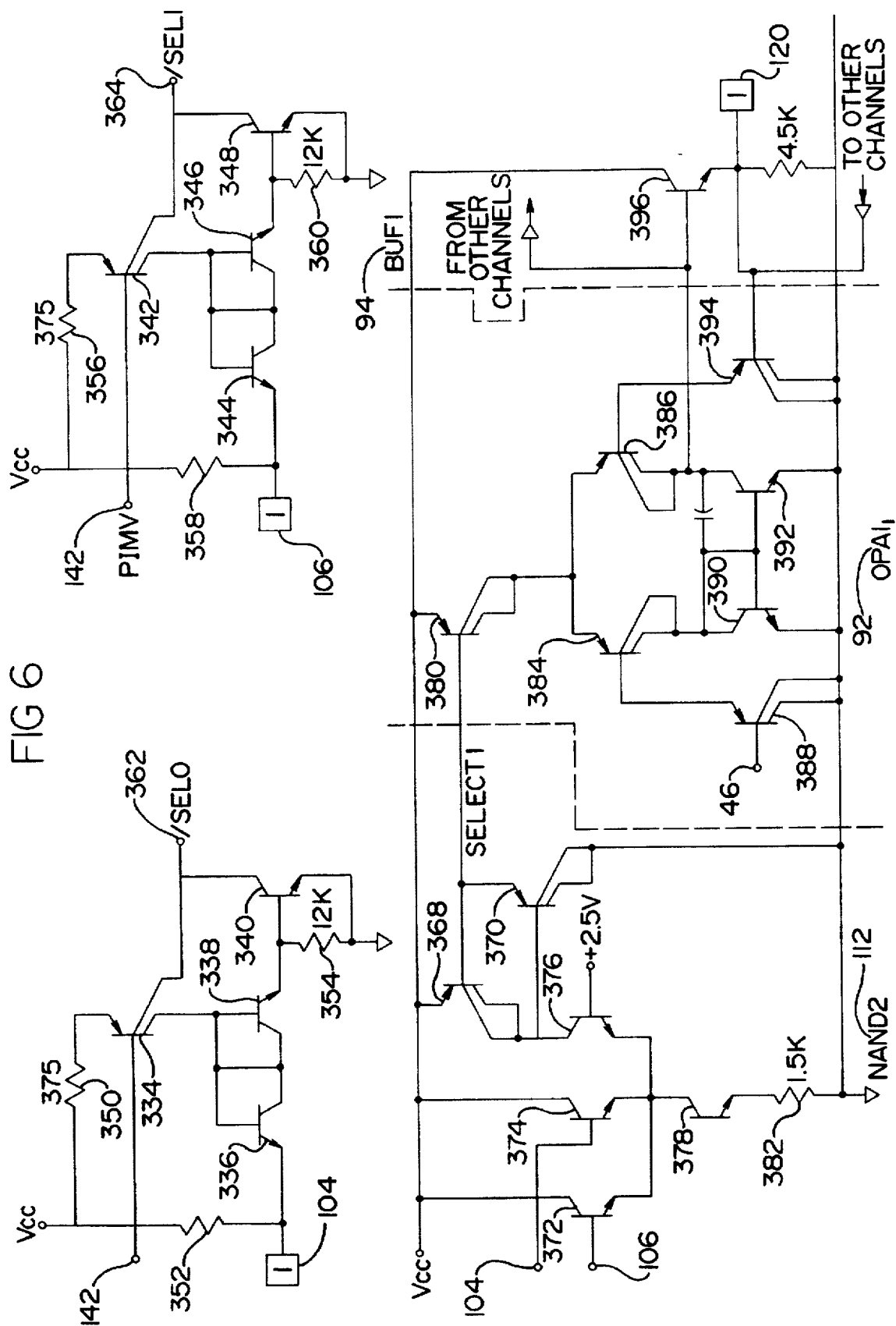
FIG. 6 is a schematic circuit diagram of the multiplexed analog channel #1 of the present invention.

The circuit diagram of the multiplexed analog channel 92 is shown in FIG. 6 together with the auxiliary circuits. Control signals 104 and 106 are inverted by circuits consisting of transistors 334, 336, . . . 348 and resistors 350, 352, . . . 360. The output signals are 362 and 364 and together with signals 104 and 106, the 2:4 decoder logic can be realized by simple NAND gates.

NAND gate 112 consists of transistors 368, 370, . . . 378 and resistor 382. When both signals 104 and 106 are logic 0 (i.e. less positive than +1.0V), the current controlled by source transistor 378/resistor 382 will flow through transistor 376 activating current mirror transistors 368, 370 and 380. When signals 104 and 106 are both equal to logic 0, channel 1 is selected. For channel 2, NAND gate 114 inputs are 362 and 106. For channel 3, NAND gate 116 inputs are 104 and 364. For channel 4, NAND gate 118 inputs are 362 and 364. Apart from the input line connections, the equivalents of NAND gate 112 in each channel are identical.

Transistors 380, and 384, 386, . . . 394 form a linear differential amplifier. Notice that there are altogether four identical stages, one in each channel. Transistor 396, however, is common to all channels.

Suppose channel 1 is activated by signal 104=logic 0 and signal 106=logic 0. In that case, current is flowing into the common emitter circuit of transistors 384, 386, 390 and 392, but all other unity gain op-amp stages are inactive due to the fact that the transistors equivalent in those circuits to transistor 380 are turned off. Since all buffer amplifiers are connected to the appropriate points to transistor 396, it is only the active differential amplifier which will have a closed loop through transistor 396. Since the base of transistor 396 is connected to the non-inverting output of the differential amplifier with respect to drain voltage input and the emitter of transistor 396 is directly connected to the inverting input, the active differential amplifier together with transistor 396 form a unity gain buffer. The other, inactive differential amplifiers have negligibly minor effect on the active stage.

The input drain voltage analog signal 46, is connected to the differential amplifier through an emitter follower, 388. This technique is used for two reasons:

1. to minimize the load on the drain voltage input; and
2. to allow very low voltage (approx. 0V or ground potential) input signals to be buffered.

By this method, even if drain voltage input signal 46 is at ground potential transistors 384 and 390 will not be saturated. This is a common practice used in linear circuit design. The current through transistor 384 activates current mirror transistors 390 and 392. The output impedance of both transistor 386 and 392 is very high provided both transistors are in their linear range of operation. Therefore, the slightest current change through transistor 386 produces comparatively large voltage changes at the common collector junction of transistor 386 and 392. But those common collectors control the base voltage of transistor 396 and its emitter voltage too, with a constant voltage drop (base-emitter voltage difference of transistor 396). The current in transistors 386/392 will therefore be controlled so, that feedback voltage 120 matches input drain voltage 46, and the balance is dynamically maintained by the common emitter current source (transistor 380) and the differential amplifier transistors (384 and 386) through the current mirror collector loads.

It is to be understood that the invention is not limited to the exact construction illustrated and described above, but that various changes and modifications may be made without departing from the spirit and scope of the invention as defined in the following claims.

We claim:

1. An electronic interface custom circuit for use in an electronic control unit used in an anti-lock brake system comprising:

a power field effect transistor for controlling a solenoid valve, said solenoid valve modulating a pressure in brake chambers or brake cylinders in said anti-lock brake system;

a micro-controller device for controlling the operation of said solenoid valve; and a solenoid driver interface circuit for interfacing between said micro-controller device and said power transistor, said solenoid driver interface circuit including:

a circuit for dynamically attenuating the drain voltage of the power transistor such that the drain voltage is attenuated by a first factor when the power transistor is turned off and by a second factor when the power transistor is turned on.

said circuit for dynamically attenuating including a feedback path connected intermediate the drain of the power transistor and logic within said solenoid driver interface circuit.

2. The electronic interface custom circuit of claim 1, wherein said circuit for dynamically attenuating the drain voltage is controlled by said logic, and said logic also determines a gate drive signal to said power transistor and therefore the drain voltage of said power transistor.

3. The electronic interface custom circuit of claim 1, wherein said circuit for dynamically attenuating the drain voltage of the power transistor comprises:

a first resistor;

a second resistor having a resistance value which is less than said first resistor;

and a first transistor wherein said first resistor is connected between the drain of said power transistor and said second resistor, said second resistor is connected between said first resistor and the collector of said first transistor and a base of said first transistor is connected to the gate of said power transistor such that when said power transistor is off, the gate voltage of said power transistor forces current to flow into the base of said first transistor driving said first transistor into saturation so that the collector voltage of said first transistor is more positive than ground, making the second and first resistors act as a drain voltage attenuator for said power transistor, wherein the amount of said attenuation provided by said drain voltage attenuator is equal to the ratio of a value of said first resistor to a value of said second resistor, and when said power transistor is on, the base current of said first transistor is shunted to ground such that a path between the first resistor and ground is broken causing no attenuation of the drain voltage.

4. The electronic interface custom circuit of claim 1, further comprising a plurality of power field effect transistors, and wherein said solenoid driver interface circuit further includes four channels between said micro-controller and said plurality of power field effect transistors, each of said four channels configured for independently controlling one of said plurality of power field effect transistors.

5. The electronic interface custom circuit of claim 4, wherein said four channels comprise two sets of channels, each said set having two channels, each of said sets being enabled by a single enable input.

6. The electronic interface custom circuit of claim 5, further comprising a status line for each of said sets for indicating the status of said channels in each of said sets.

7. The electronic interface custom circuit of claim 6, wherein the status of said channels is determined by comparing input signals to an exclusive or-gate.

8. The electronic interface custom circuit of claim 1, wherein said solenoid driver interface circuit is configured as a single application specific integrated circuit.

9. The electronic interface custom circuit of claim 6, wherein the drain voltage of said power field effect transistor is compared to an adjustable reference voltage, which can be adjusted by adjusting the value of an external programming resistor connected between said solenoid driver interface circuit and ground, said adjustable reference voltage being adjusted such that if the power field effect transistor is on and the drain voltage is more positive than the adjustable reference voltage, said solenoid valve is assumed to be shorted and the power field effect transistor is placed in a turn-off state, wherein the gate drive of the power transistor is turned off and the status line corresponding to the channel to said power transistor displays a fault.

10. The electronic interface custom circuit of claim 9, wherein said turn-off state is permanently latched and said latching can only be removed by resetting a control input to said solenoid driver interface circuit.

11. The electronic interface custom circuit of claim 4, wherein the drain voltage of each of said plurality of power transistors is presented through a multiplexed analog interface to said micro-controller such that only one power transistor drain is monitored at any given time, and wherein the selection of which of the power transistor drains is to be monitored is determined by selector lines input to said solenoid driver interface circuit.

12. The electronic interface custom circuit of claim 4, further comprising a first current sink for providing a current sinking capability to all of said channels to simultaneously turn off all of said plurality of power field effect transistors by clamping the gate driven to each of said plurality of power field effect transistors to ground within the solenoid driver interface circuit.

13. An electronic interface custom circuit for use in an electronic control unit used in an anti-lock brake system comprising:

a power field effect transistor for controlling the application of power to a solenoid valve for modulating the pressure in brake chambers or brake cylinders in said anti-lock brake system;

a micro-controller device for controlling the operation of said solenoid valve; and a solenoid driver interface circuit for interfacing between said micro-controller device and said power transistor, said solenoid driver interface circuit including:

means for detecting a short circuit or open circuit condition of said solenoid valve, said means for detecting including an adjustable reference voltage and means for comparing the drain voltage of said power field effect transistor to said adjustable reference voltage, wherein the adjustable reference voltage is adjusted by adjusting the value of a first programming resistor connected between said solenoid driver interface circuit and ground, and wherein if the power field effect transistor is on and the drain voltage thereof is more positive than the adjustable reference voltage, said solenoid valve is assumed to be shorted and the power field effect transistor is placed in a turn-off, state wherein the gate drive of the power field effect transistor is turned off.

14. The electronic interface custom circuit of claim 13, further comprising a plurality of said power field effect transistors, and wherein said solenoid driver interface circuit includes four channels between said micro-controller and said plurality of power field effect transistors, each of said four channels being configured for independently controlling one of said plurality of power field effect transistors.

15. The electronic interface custom circuit of claim 14, wherein said four channels comprise two sets of channels, each said set having two channels being enabled by a single enable input.

16. The electronic interface custom circuit of claim 15, further comprising a status line for each of said two sets for indicating the status of said channels in each of said sets.

17. The electronic interface custom circuit of claim 16, wherein the status of said channels is determined by comparing an input signal of said solenoid driver interface circuit and an output signal thereof in an exclusive or-gate.

18. The electronic interface custom circuit of claim 16, wherein the status line corresponding to a channel having a shorted solenoid indicates a fault.

19. The electronic interface custom circuit of claim 16, wherein the turn-off state is permanently latched and said latching can only be removed by resetting a control input to said solenoid driver interface circuit.

20. The electronic interface custom circuit of claim 14, wherein the drain voltage of each of said plurality of power transistors is presented through a multiplexed analog interface to said micro-controller such that only one power transistor drain is monitored at any given time and wherein the selection of which power transistor drain being monitored is determined by selector lines input to said solenoid driver interface circuit.

21. The electronic interface custom circuit of claim 13, further comprising an external current sinking signal with substantial current sinking capability which can be applied to all of said channels to simultaneously turn off all of said plurality of power transistors by clamping the gate drive to each of said plurality of power transistors to ground within the solenoid driver interface circuit such that logic within said solenoid driver interface circuit turns said gate drives off.

22. The electronic interface custom circuit of claim 13, wherein said solenoid driver interface circuit further comprises:

means for dynamically attenuating the drain voltage of the power transistor such that the drain voltage is attenuated when the power transistor is turned off and is not attenuated when the power transistor is turned on.

23. The electronic interface custom circuit of claim 22, wherein said means for dynamically attenuating comprises a feedback path connected between the drain of the power transistor and logic within said solenoid driver interface circuit.

24. The electronic interface custom circuit of claim 23, wherein means for attenuation is controlled by said logic and said logic also determines the gate drive to said power transistor and with it the drain voltage of said power transistor.

25. The electronic interface custom circuit of claim 24, wherein said means for attenuation comprises:

an external resistor;

an internal resistor having a resistance value which is less than said external resistor;

and an internal transistor wherein said external resistor is connected between the drain of said power transistor and said internal resistor, said internal resistor is connected between said external resistor and the collector of said internal transistor and the base of said internal transistor is connected to the gate of said power transistor such that when said power transistor is off, the gate voltage of said power transistor is near ground potential forcing current to flow into the base of said internal transistor driving said internal transistor into saturation so that the collector voltage of said internal transistor is only slightly more positive than ground making the internal and external resistors act as a voltage attenuator wherein the amount of attenuation is equal to the ratio of said external resistor value to said internal resistor value and when said power transistor is on, the base current of said internal transistor is shunted off to ground such that a path between the external resistor and ground is broken causing no attenuation of the drain voltage.

26. An electronic interface custom circuit for use in an electronic control unit used in an anti-lock brake system comprising:

a power field effect transistor for providing power to a solenoid valve for modulating the pressure in brake chambers or brake cylinders in the brake system;

a micro-controller device for controlling the operation of said solenoid valve; and a solenoid driver interface circuit for interfacing between said micro-controller device and said power transistor, said solenoid driver interface circuit being configured as a single application specific integrated circuit including;

means for detecting a solenoid short circuit or open circuit, said means for detecting including an adjustable reference voltage wherein the drain voltage of said power transistor is compared to said adjustable reference voltage, which can be adjusted by adjusting the value of an external programming resistor connected between said solenoid driver interface circuit and ground, said adjustable reference voltage being adjusted such that if the power transistor is on and the drain voltage is more positive than the adjustable reference voltage it is taken as a sign of a shorted solenoid and the power transistor is placed in a turn-off state wherein the gate drive of the power transistor is turned off; and means for dynamically attenuating the drain voltage of the power transistor such that the drain voltage is attenuated when the power transistor is turned off and is not attenuated when the power transistor is turned on.

27. The electronic interface custom circuit of claim 26 wherein said solenoid driver interface circuit includes four channels between said micro-controller and a plurality of power field effect transistors, each of said four channels configured for independently controlling one of said plurality of power transistors.

28. The electronic interface custom circuit of claim 27 wherein said four channels comprise two sets of two channels each, said each of said two sets is pair-wise enabled by a single enable input.

29. The electronic interface custom circuit of claim 28 further comprising a status line for each of said two sets for indicating the status of said channels in each of said sets.

30. The electronic interface custom circuit of claim 29 wherein the status of said channels is determined by comparing input and output signals to said solenoid driver interface circuit in an exclusive-or gate.

31. The electronic interface custom circuit of claim 29 wherein the status line corresponding to a channel having a shorted solenoid displays a fault.

32. The electronic interface custom circuit of claim 29 wherein the turn-off state is permanently latched and said latching can only be removed by resetting a control input to said solenoid driver interface circuit.

33. The electronic interface custom circuit of claim 27 wherein the drain voltage of each of said plurality of power transistors is presented through a multiplexed analog interface to said micro-controller such that only one power transistor drain is monitored at any given time and wherein the selection of which power transistor drain being monitored is determined by selector lines input to said solenoid driver interface circuit.

34. The electronic interface custom circuit of claim 26 further comprising an external current sinking signal with substantial current sinking capability which can be applied to all of said channels to simultaneously turn off all of said plurality of power transistors by clamping the gate drive to each of said plurality of power transistors to ground within the solenoid driver interface circuit such that logic within said solenoid driver interface circuit turns said gate drives off.

35. The electronic interface custom circuit of claim 26 wherein said means for dynamically attenuating comprises a feedback path connected between the drain of the power transistor and logic within said solenoid driver interface circuit.

36. The electronic interface custom circuit of claim 35, wherein means for attenuation is controlled by said logic and said logic also determines the gate drive to said power transistor and with it the drain voltage of said power transistor.

37. The electronic interface custom circuit of claim 36, wherein said means for attenuation comprises:

an external resistor;

an internal resistor having a resistance value which is less than said external resistor;

and an internal transistor wherein said external resistor is connected between the drain of said power transistor and said internal resistor, said internal resistor is connected between said external resistor and the collector of said internal transistor and the base of said internal transistor is connected to the gate of said power transistor such that when said power transistor is off, the gate voltage of said power transistor is near ground potential forcing current to flow into the base of said internal transistor driving said internal transistor into saturation so that the collector voltage of said internal transistor is only slightly more positive than ground making the internal and external resistors act as a voltage attenuator wherein the amount of attenuation is equal to the ratio of said external resistor value to said internal resistor value and when said power transistor is on, the base current of said internal transistor is shunted off to ground such that a path between the external resistor and ground is broken causing no attenuation of the drain voltage.

38. An electronic interface custom circuit for use in an electronic control unit used in an anti-lock brake system comprising:

a power field effect transistor for providing power to a solenoid valve for modulating a pressure in brake chambers or brake cylinders in the brake system;

a micro-controller device for controlling the operation of said solenoid valve; and a solenoid driver interface circuit for interfacing between said micro-controller device and said power transistor; said solenoid driver interface circuit including:

a detecting circuit for detecting a solenoid short circuit or open circuit condition, comparing the drain voltage of said power field effect transistor with a reference voltage, and controlling said power field effect transistor based on said comparison; and an attenuating circuit for attenuating the drain voltage of the power field effect transistor such that the drain voltage is attenuated by a first factor when the power field effect transistor is turned off and is attenuated by a second factor when the transistor is turned on.

* * * * *